May 1, 1962 W. J. TULL ETAL 3,032,756
AIRCRAFT INSTRUMENT APPROACH AND LANDING SYSTEM
Filed March 17, 1960 3 Sheets-Sheet 2

*INVENTOR.*
WILLIAM J. TULL
JOHN W. GRAY
BY
ATTORNEY

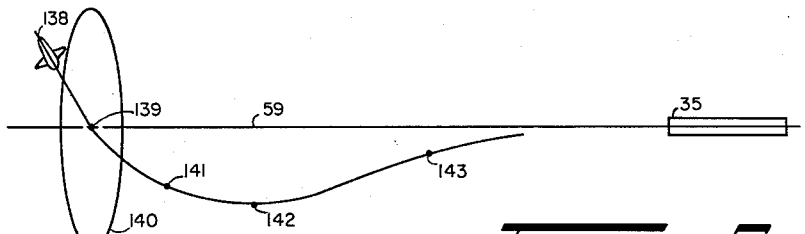
FIG-5
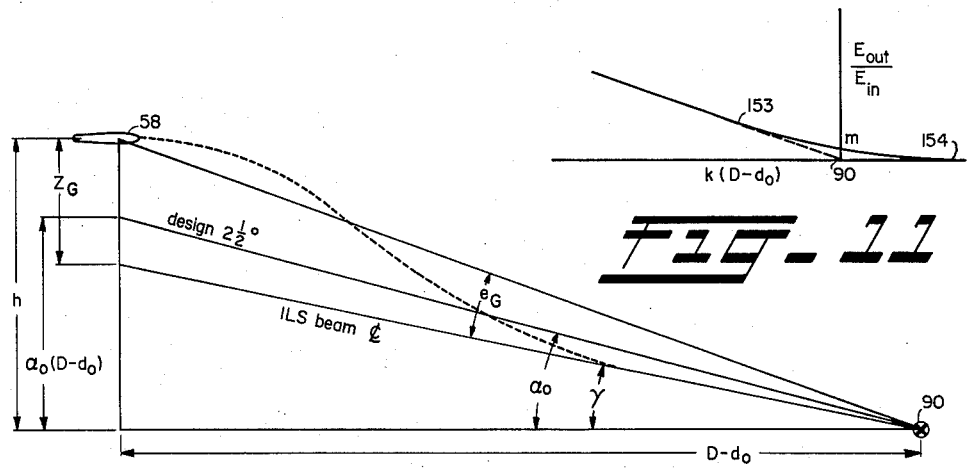
FIG-11
FIG-10
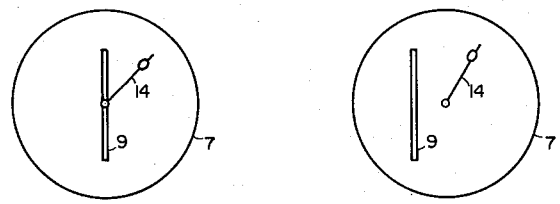
FIG-6  FIG-7
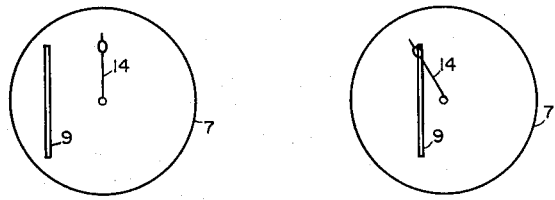
FIG-8  FIG-9
INVENTOR.
WILLIAM J. TULL
JOHN W. GRAY
ATTORNEY

3,032,756
AIRCRAFT INSTRUMENT APPROACH AND LANDING SYSTEM
William J. Tull and John W. Gray Pleasantville, N.Y., assignors to General Precision, Inc., a corporation of Delaware
Filed Mar. 17, 1960, Ser. No. 15,577
17 Claims. (Cl. 343—6)

This invention relates to instruments for controlling the approach or landing of an aircraft at a runway without requiring visual ground contact.

Present landing and approach methods and systems fall short of perfection, as is evidenced by the fact that blind instrument landings are by no means routine. Blind approaches are in more frequent use, but have limitations. Two generally used systems are the instrument landing system, abbreviated ILS, and the ground control approach system, abbreviated GCA.

When ILS is used, it is generally utilized only for instrument approach and contrary to its appellation is not used for landing. ILS employs a "localizer" radio beam transmitted from the far end of an airport runway toward the direction from which an aircraft is to approach. The beam includes two partly overlapping lobes in the slant plane, so that a receiver on the aircraft indicates the angular bearing error relative to the runway bearing. A second "glide slope" radio beam containing two vertical lobes is transmitted from a second transmitter near the end or threshold of the runway, and defines the proper vertical angle of aircraft approach. The aircraft receiver presents data representing bearing and glide slope error as visual indications on the face of a single pilot direction indicator. A third indication, of linear lateral error, may also be shown on the same indicator dial.

It is generally realized by pilots that ILS indications leave something to be desired. Due to radio reflections from nearby objects the beam directions are not always entirely reliable. In fact, frequently both the localizer and the glide slope beam center guiding lines are not straight, but wavy. Another reason why the indications are less than completely satisfactory is that, as the aircraft approaches the runway threshold, the angular error represents smaller and smaller linear lateral steering errors, while the received signal rapidly grows stronger and stronger. As a result, before the threshold is reached the receiver indicator becomes saturated by the received signal, and the indicating pointer is at all times against either one stop or the other. This renders the instrument nearly useless, for no indication of amount of error is given, but only of its sense. Additionally, the ILS gives no indication of the distance remaining to the threshold. Recognizing these shortcomings, present rules for operation of aircraft specify the same minimum visibility for ILS approaches as for non-instrument approaches.

Widely used Doppler navigation systems operate by directing several microwave radio beams from the aircraft toward the earth and receiving their reflections from the earth at the aircraft. By measuring the Doppler frequency differences in the received echoes, information is secured of the aircraft ground track speed and of the drift angle between the ground track direction and the aircraft heading direction. By combining this information with heading reference information the aircraft track direction can be computed. These outputs can be combined, by means of a computer, to display on dials the track angle, distance travelled, and distance to go to a selected destination.

The degree of accuracy which is built into a Doppler navigational system is strictly a design choice. Doppler systems, as presently constructed for navigational purposes with suitable accuracies for these purposes are, as a practical matter, more easily combined with other systems to attain sufficient accuracy in approach and landing procedures than by redesign for requisite accuracy of the Doppler system for use alone in landing. The barometric altimeter is generally relied upon for pilot altitude information, but may be in error by ±500 feet or even more, for a variety of reasons. Therefore this instrument by itself can hardly be relied upon for approach or landing information to the accuracy and with the reliability required.

The present invention combines two systems, one providing horizontal and vertical guide paths and the other giving course angle error, with a rate of climb device or an altimeter in such a way that the advantages complement each other. For example, the ILS, radar, Tacan and other systems provide path guidance and the Doppler navigational system and inertial navigational system provide course angle error. The barometric altimeter, radar altimeter, an inertial platform, integrating accelerometer, or other suitable type of altimeter can be used as the rate of climb device. As examples, the ILS system, the Doppler navigational system and the barometric altimeter are selected to illustrate the invention.

It has been found possible, by the use of feedback correcting paths, to minimize the errors contributed by each system in the output of the combination. Specifically, the effects of the ILS wavy guide lines are eliminated, the ILS oversensitive indications near the runway are changed to useful sensitive indications, and an indication of distance to threshold is added. The Doppler navigational system accumulated errors are eliminated by what amounts to a positive fix at the start of approach, and even the several barometric errors are cancelled by feedback integration of the barometric output with the ILS output.

With the combination of this invention the pilot knows when he is about to touch down, and at that time knows what course correction he must make to align his landing gear to the runway. Even after touchdown the pilot has an instrument indication of his track relative to the runway center line. In the case of a missed approach, the same instrumentation is capable of providing a signalled point of navigation initiation at the far end of the runway.

The apparatus of this invention can be used alone, or with appropriate runway equipment as a take-off monitor, a facility imperatively required for jet operation. The invention can also be used as an open-loop device for a number of purposes. For example, the horizontal indicators of the invention can be employed in association with ILS, VOR, radio range, Tacan, Decca, or other guidance systems to calibrate the directional gyro with which many aircraft are equipped. The vertical indicator of the invention can be employed, in open-loop operation, with any of the above or other systems capable of providing the desired data. In operation of the vertical indicator the pilot is not restricted to the use of any particular glide slope angle, but has wide freedom of choice.

As an example of the application of this invention, its apparatus combines components of ILS, a Doppler system and a barometric altimeter, together with additional circuitry and a dial and switch panel. Before an approach, landing field data are set into this panel. In operation with ILS, the approach components of the system are actuated either automatically or manually at the outer marker approach beacon. Thereafter, the pilot steers the aircraft, or an autopilot does it for him, in accordance with three signals displayed on a single dial. As in all successful aircraft instruments, the pilot's job is made easier by the instrumentation of this invention because part of the direction is taken over by automatic instrumentation. Near the runway threshold the steered aircraft gradually turns into bearing alignment with the runway center line and in elevation the glide slope angle decreases to a gentle flareout, the touchdown and final landing roll. These terminal operations can all be executed either automatically or manually by the use of a suitable indicator.

The purpose of this invention is to provide an improved aircraft blind approach and landing system.

A further understanding of this invention may be secured from the detailed description and accompanying drawings, in which:

FIGURES 2, 4 and 5, are plan views of the approach and landing paths defining dimensions and signals.

FIGURES 6 to 9 depict the appearance of the pilot direction indicator at various points in the approach path shown in FIGURE 5.

FIGURES 10 and 11 illustrate characteristics of the descent path glide slope and of the instrumentation.

Figure 1:
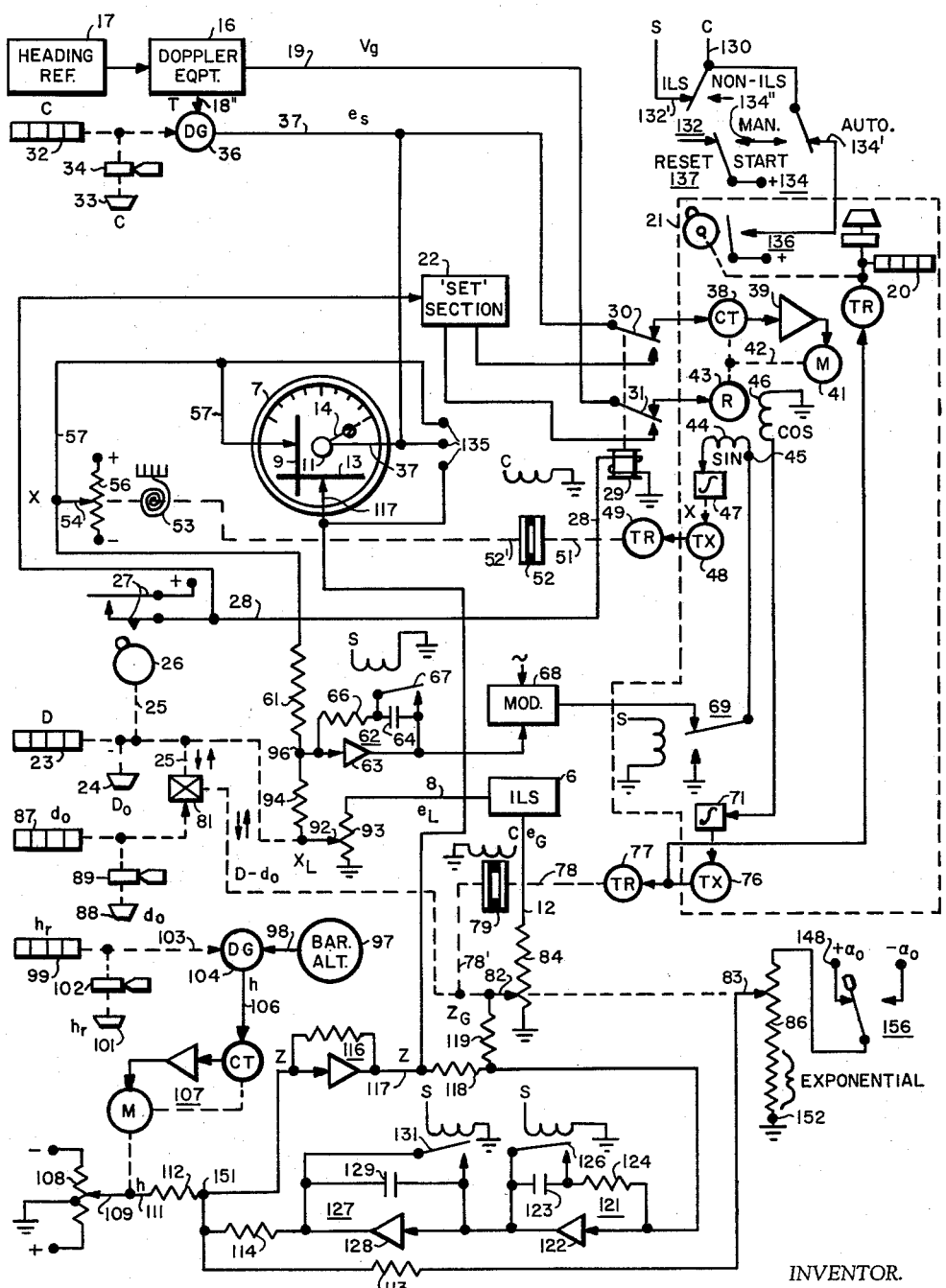
FIGURE 1 is a schematic drawing of the apparatus of the invention.

Referring now to FIGURE 1, the rectangle 6 represents an ILS radio receiver installed on an aircraft, and the instrument face 7 represents the associated indicator positioned for observation by the pilot. This system has two transmitters on the ground at or near the runway which emit beams for guiding the aircraft to a landing. One is termed the localizer beam and guides the aircraft in bearing. The other is termed the guide slope beam and guides in elevation slope. The receiver on the aircraft receives these beams and emits two signals representing angular errors in the aircraft approach. One emitted signal, $e_L$, has a direct potential amplitude representing horizontal angular error of the aircraft determined by the line between the localizer transmitter station and the aircraft. This signal is emitted on conductor 8. It ordinarily causes proportionate deflection of a vertical rod, or bail, 9, in instrument 7, relative to the center, 11, of the dial. The second signal, $e_G$, emitted on conductor 12, has a direct potential amplitude representing vertical angular error of the aircraft determined by the line between the glide slope transmitter station and the aircraft. This signal is applied, in conventional ILS operation, to the horizontal bail 13 of instrument 7 to indicate by its distance from the center, 11, of the dial, the amount of vertical angle position error.

The ILS instrument 7 has a third indicator on its dial, a needle or hand, 14, pivoted at the center of the dial. This needle is conventionally operated by an alternating current synchro signal generated at a magnetic compass, and indicates in degrees the heading of the aircraft.

These ILS components are widely used. For example, the pilot direction indicator 7 is known to many pilots as the ID–249. One type in common use is made by Weston Electric Instrument Corporation and coded ID–249B/ARN. It is, however, to be understood that for the commonly-used ID–249 any other type of pilot direction indicator may be employed with this invention.

An instrument for producing an outer marker signal is also associated with the instrument landing system. The outer marker signal is a radio signal continuously emitted in a vertical fan beam by a ground transmitter in line with the runway and 5 to 7 miles from its near end or threshold. This signal is received by a receiver on the aircraft as it flies through the beam.

A Doppler navigational system 16 is installed on the aircraft. It may consist, for example, of a system such as is described in patent application Serial No. 588,908, entitled Microwave Drift Sight and Speed Indicator, by William J. Tull et al., now Patent No. 2,915,748. This system receives a signal representing magnetic heading $H_{mag}$ from a compass, 17, generates a signal, $\delta$, representing drift angle, and emits a synchro signal, T, at conductor 18 representing the angle which the earth projection of the track or path of the aircraft makes relative to magnetic North. That is $$H_{mag} + \delta = T \qquad (1)$$

The system 16 also generates and emits a signal representing the speed, $V_g$, along the ground track, which is emitted as a 400 c.p.s. signal amplitude on conductor 19.

A computer is associated with the Doppler system. This computer may be, for example, the track navigation computer, type TNC–50, made by GPL Division of General Precision, Inc. The TNC–50 computer has two identical sections, so that while a run is being navigated with the aid of one computer section, the other computer section may be set up ready to compute and control the next run, at a different course angle. Each computer section contains a track dial, distance-to-go dial and distance-off-track dial. Several circuit components and the distance-to-go dial 20 of one computer section, termed the Run section, are indicated within the dashed rectangle 21. The other section, termed the Set section, is indicated merely by the small rectangle 22.

The invention is additionally instrumented by the provision of another distance-to-go dial 23 and setting knob 24. These components are not in the computer TNC–50 and are in addition to the two distance-to-go dials and knobs in its Set and Run sections. The dial 23 and setting knob 24 are connected to a shaft 25 which is also connected to a cam 26 having contacts 27. Rotation of the shaft 25 rotates cam 26, which closes contacts 27. These contacts are connected, through conductor 28, to a relay 29 having contacts 30 and 31. These contacts transfer the outputs of the Doppler equipment 16 from the Run section of the computer to its Set section.

Figure 2:
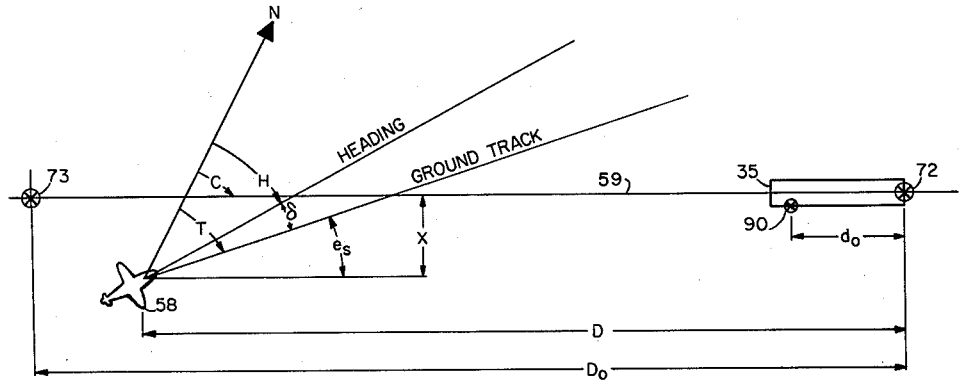

A dial 32 and setting knob 33 with a detent or one-way drive 34 are provided for setting in the magnetic azimuth C of the airfield runway on which a landing is to be made. This angle C is indicated in FIGURE 2, which shows a plan view of a runway 35. The angles C and T are subtracted in a differential synchro generator 36, FIGURE 1, to produce on conductor 37 a signal representative of the angular track or steering error $e_s$. That is, $$C - T = e_s \qquad (2)$$

These quantities are diagrammatically indicated in FIGURE 2.

The electrical signal $e_s$ is converted into a proportional shaft angle by a position servomechanism consisting of a control transformer 38, FIGURE 1, amplifier 39 and motor 41. The motor shaft 42 rotates a resolver 43 supplied through conductor 19 with the current representing signal $V_g$ and therefore producing outputs in its orthogonal windings 44 and 46 respectively representing $V_g \sin e_s$ and $V_g \cos e_s$. The synchro signal $e_s$ is also applied from conductor 37 to the needle 14 of indicator 7, causing an angular dial indication of the angle $e_s$. $V_g \sin e_s$ being the cross-course rate, its integral is cross track error distance $x$, or $$x = \int V_g \sin e_s \, dt + K \qquad (3)$$

in which K is the constant of integration. Integration is carried out in a motor-tachometer integrator 47, to which one end of the sine winding 44 is connected as input, and the shaft rotation is converted by synchro transmitter 48 to an electrical signal. This signal is reconverted by a torque repeater 49 to the angular rotation of a shaft 51. This shaft is interrupted by a magnetic clutch 52. On the other side of the clutch the shaft 52' is centered, when unclutched, by a centering spring 53. The shaft 52' drives the slider 54 of a potentiometer 56 which converts the signal to a representative direct current in conductor 57. This signal representing the quantity $x$ is applied to the indicator 7 to position its bail 9. Thus the horizontal position of the vertical bail 9 relative to the dial center point 11 represents $x$, and is a measure of the distance of the aircraft 58, FIGURE 2, from the runway longitudinal center line 59.

The slider 54, FIGURE 1, is additionally connected through a resistor 61 to an integrator 62 composed of an amplifier 63 shunted by a capacitor 64 in series with a damping resistor 66. The capacitor 64 is shunted by a switch 67. The integrator output is converted to a proportional 400 c.p.s. alternating signal by a modulator 68. The output is connected through a two-position switch 69 to the other end of sine winding 44.

The cosine winding 46 is grounded at one end and connected at the other to the input of a second, similar motor-tachometer integrator 71 having an output $$D_o - D = \int V_g \cos e_s \, dt \tag{4}$$

in which D is the horizontal distance between the aircraft and the localizer transmitter 72, FIGURE 2, and $D_o$ is the distance between transmitter 72 and the outer marker beacon 73. The output shaft rotation is converted to an electrical signal by synchro transmitter 76, FIGURE 1, and reconverted to a shaft 78 rotation by torque repeater 77. This shaft 78 is interrupted by a magnetic clutch 79. The continuation shaft 78' is connected to a gear differential 81 and to the sliders 82 and 83 of two potentiometers 84 and 86. The potentiometer 84 is linear and potentiometer 86 is linear to a point near its grounded end, being non-linearly tapered from that point with decreasing resistance gradient. One of the other mechanical terminals of the differential 81 is connected to a dial 87 with a setting knob 88 and detent or one-way drive 89. The dial 87 and knob 88 are utilized for the purpose of setting in the distance $d_o$, the distance along the runway between the localizer transmitter, 72 and the glide slope transmitter, 90. This distance, $d_o$, is shown in FIGURE 2. The third mechanical terminal, 25, of the differential 81 is connected to the slider 92 of a potentiometer 93 and to the dial 23 and knob 24. This knob 24 is geared to the shaft 25 without a detent, so that the dial 23 can be driven either by the knob 24 or from the differential 81. A resistor 94 connects the slider 92 to the resistor 61 at junction 96.

A barometric altimeter 97 is provided in the aircraft. Conventional forms have an integral adjustment for sea-level barometric pressure and an electrical synchro output at conductor 98 representing the altitude $h_s$ above sea level in feet. A dial 99 with knob 101 and detent or one-way drive 102 are provided for setting in the altitude, $h_r$, of the airport runway above sea level. This quantity is applied as the deflection of a shaft 103 to a differential synchro generator 104, which subtracts the deflection quantity from the barometric altitude above the sea level to form an alternating electrical synchro signal $h$ in conductor 106 representing the altitude of the aircraft above the runway. That is $$h = h_s - h_r \tag{5}$$

The electrical signal $h$ is converted into a mechanical signal by the servomechanism 107, and in turn into a direct-current signal by the potentiometer 108 at its slider 109.

The direct-current signal $h$ at slider 109 is impressed, through a conductor 111, on one end of a resistor 112 which, together with resistors 113 and 114 and an amplifier 116, composes an adding circuit. The amplifier output is connected through conductor 117 to the horizontal bail 13 of instrument 7 and to one end of a resistor 118. This resistor together with resistor 119 and integrator 121 constitutes another adding circuit. Integrator 121 comprises an amplifier 122 shunted by a capacitor 123 and damping resistor 124 in series. The capacitor is shunted by a switch 126. The integrator 121 is connected through a second integrator 127 to the other end of resistor 114. The integrator 127 consists of an amplifier 128 shunted by a capacitor 129. The capacitor may be short circuited by a switch 131.

Figure 3:
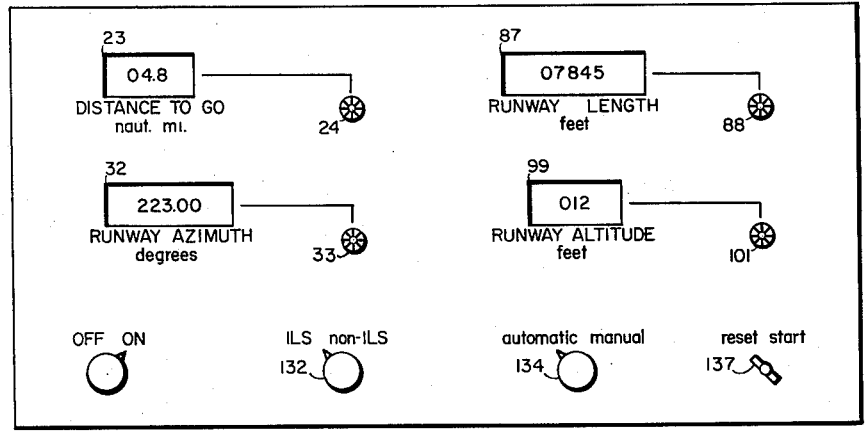
FIGURE 3 depicts the dial and switch panel of the invention.

The four switches 67, 69, 126 and 131 are electrically operated, as are the two magnetic clutches 52 and 79, and this fact is indicated by the small coil shown beside each. One end of each clutch coil is grounded and the other end is coded "c," indicating that it is connected to the end similarly marked of a conductor 130 connected to the arm of a switch 132. This switch is shown in the switch panel drawing, FIGURE 3, marked ILS/non-ILS. One end of each switch coil is grounded and the other end is coded "s," indicating that it is connected to the similarly-coded contact 132' of switch 132. The arm conductor 130 of switch 132 is additionally connected to the arm of another manual switch 134. This switch is also shown in FIGURE 3 marked automatic/manual. One contact 134' is connected to the contact of a switch 136 in the computer 21 for applying positive potential thereto. The other contact 134" is connected to one contact of a start reset switch, 137, the other contact being connected to positive potential.

In automatic ILS operation, when the computer indicates the end of its run at the outer marker beacon, the computer contact 136 closes, operating the two clutch coils and the four switch coils to the operated positions in which they are drawn in FIGURE 1. In manual ILS operation, switch 134 being at "manual," when the pilot sees the outer marker beacon visible signal or hears the audible signal, and his aircraft is at the center of the outer marker beam, he operates the locking switch 137 to its "start" position. This operates the two clutches and four switches to the positions depicted.

It is obvious that these switch components can be arranged for automatic operation by the outer marker beacon or other fixing means if desired. This additional complication may be undesirable in some cases.

When the aircraft is equipped with an autopilot it may be connected directly to the three output conductors 37, 57 and 117 of the circuit of FIGURE 1 at terminals 135. The aircraft is then steered by the autopilot automatically, although the instrument 7 is still operative and can be observed by the pilot during approach if he so desires.

In operation of the circuit of FIGURE 1, it is assumed that a landing is to be made at an airfield equipped with ILS and an outer marker radio transmitter. It is also assumed that the approach is made by manual steering, that is, without use of the autopilot. The pilot can approach the outer marker with the aid of the Doppler navigational radar and computer, or he can approach it manually. When the Doppler navigational computer is used it should be set so as to end its run at the position of the outer marker, or, in the absence of an outer marker, at the point in line with the runway at which the outer marker would be located if it existed. The computer dial 20, "naut. miles to go," will then read zero when the outer marker position is reached. In either case the pilot's aim should be to arrive at the outer marker position at the specified altitude of about 1500 feet, at which altitude it is intersected by the glide slope radio beam, on a track equal to the runway heading, and pointing directly along the runway.

Before arriving at the outer marker the pilot must set the switches and four dials shown in FIGURES 1 and 3. The horizontal distance $D_o$, FIGURE 2, between the outer marker beacon transmitter 73 and the ILS localizer transmitter 72 is set on the dial 23 by means of the knob 24. The published azimuth, length and altitude, of the runway are set on dials 32, 87 and 99 by means of their knobs 33, 88 and 101. Switch 132 is set to "ILS," switch 134 is set to "automatic" and switch 137 is set to "reset."

At this time the two clutches 52 and 79 are unclutched and the four switches 67, 69, 131 and 126 are in the positions opposite to those shown on the drawing.

When the aircraft arrives at the outer marker, electric power is applied from switch 136 through switch 134 to the clutches and switches operating them to the positions shown in FIGURE 1. The Doppler-derived signal $e_s$ is applied to indicate the aircraft track error on the needle 14 of instrument 7. The Doppler navigational signal $V_g$ and signal $e_s$ are applied to the resolver 43. The resolver emits a cosine signal which, through integrator 71 and clutch 79 positions shafts 78′ and 25. The rotation of shaft 25 is in such direction that the reading of the dial 23 decreases continually and at any instant indicates the remaining distance to go, D, to the localizer transmitter 72 at the far end of the runway.

At the instant before the clutches are closed, the shaft 52′ and potentiometer slider 54 are centered by the centering spring 53, so that the localizer bar 9 of instrument 7 is positioned exactly at the center of the instrument. When the clutch closes, a deflection $x$ may begin to be set into the potentiometer slider 54 with a corresponding signal output therefrom deflecting the bail 9 from the instrument center.

Figure 4:
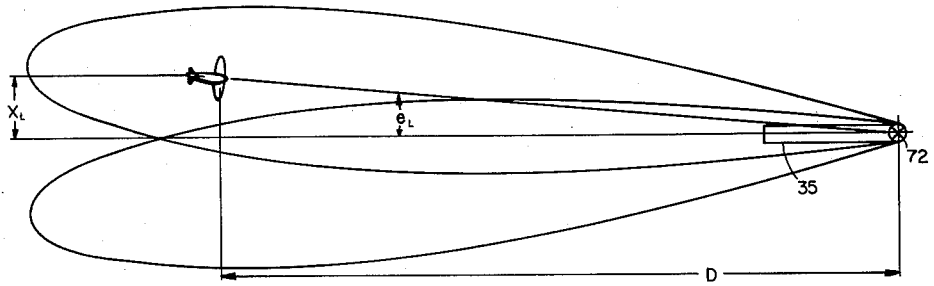

Meanwhile, a localizer signal is received by the ILS receiver 6, and from this signal the receiver derives a signal $e_L$ indicating the angular azimuth or bearing error in aircraft position relative to the beam center. The angle represented by this error signal, $e_L$, is diagrammatically illustrated in FIGURE 4. The signal is multiplied by the shaft deflection representing the quantity D in potentiometer 93, FIGURE 1, to form a signal $x_L$ representing the distance between the aircraft and the runway center line 59. Thus this distance has been measured by the ILS system and by the Doppler system, and the signals representing it are respectively $x_L$ and $x$. The localizer signal $x_L$ contains the short-time errors due to radio reflections while the Doppler signal contains Doppler initial position error.

These two signals are subtracted at resistors 61 and 94 to form a function, $$\frac{1}{\tau}(x-x_L)$$

in which $\tau$ is a time constant. This function is applied to the damped integrator 62. In passing through it, and specifically by cooperation of the capacitor 64, an additional term consisting of the integral of the above term is added to form the sum $$\frac{1}{\tau}(x-x_L)+K\!\int (x-x_L)dt$$

This signal is converted to 400 c.p.s. alternating current in modulator 68 and applied to the sine winding 44, where it is added to the potential $V_g \sin e_s$ induced therein.

Thus these components form a closed loop which tends to approach a null, the error meanwhile having the form $$\frac{dx}{dt}$$

and the loop equation being $$\frac{dx}{dt}=V_g \sin e_s -\frac{1}{\tau}(x-x_L)-K\!\int (x-x_L)dt \qquad (6)$$

The term $$\frac{1}{\tau}(x-x_L)$$

corrects $x$ to make it equal to $x_L$, which inherently includes $V_g \sin e_s$, while the $K\!\int(x-x_L)dt$ term, having longer damping, adds a bias to $$\frac{dx}{dt}$$

to nullify any small errors in the azimuth setting, C, or in the magnetic compass input.

The nulling operation of the loop proceeds until the initial error of $x$ becomes zero, and this action proceeds regardless of pilot action provided the aircraft remains in the linear signal region. Assuming appropriate pilot steering, as will be described, this loop action virtually eliminates Doppler and ILS error and places the aircraft above the runway center line extended, line 59. Moreover, this center line is approached with tapered-off error, as indicated in FIGURE 5.

As an example of the operation of this loop, let it be supposed that, on the aircraft track 138, FIGURE 5, the aircraft is at the point 139. It is passing through the outer marker beam 140 and the system starts to operate. Since the course is to the right of the correct course the indicating arm 14, FIGURE 6, of the ILS indicator 7 points to the right, indicating that the pilot should steer to the left to correct his course and turn the arm 14 counterclockwise. At this starting time the vertical bail 9 is in the center and, since the aircraft is over the center line 59, $x=0$ and the bail 9 remains at the center. However, when the pilot has reached the point 141 the course is still too far to the right and his departure from the line 59 causes the bail to move to the left, as shown in FIGURE 7. To the pilot the face of the instrument represents a plan of the terrain, with himself at the center, 11, and the relative position of the runway center line indicated by the bail 9. The pilot, correcting his course, steers toward the left so that at point 142 his course is parallel to the runway but his $x$-error has increased as shown in FIGURE 8. The pilot now endeavors to match the arm 14 and bail 9, with the result that the path curves toward the runway and approaches it gradually, as indicated at point 143. His instrument arm 14, FIGURE 9, shows a left course but the bail 9 is approaching the center. Continuation of this action, in combination with the described loop action, brings the aircraft track over and parallel to the runway center line in the theoretically shortest possible time without overshooting it. Thus, the easiest and most expeditious curving approach into the correct track is accomplished.

Similar circuitry is employed in the vertical direction approach steering. This circuitry consists of the closed loop including integrators 121 and 127, the addition circuit including resistors 112, 113 and 114 and the amplifier 116, and the adding resistors 118 and 19, together with associated components. The angles and distances involved are shown in FIGURE 10. The output of this loop is the quantity $z$ applied to the pilot direction indicator 7. Inputs are $\alpha_0$, $e_G$, $D-d_0$, and $h$.

A direct positive potential representing $\alpha_0$ is applied from terminal 148 through switch 156 to potentiometer 86. $\alpha_0$ represents a nominal glide slope angle of 2½°. This angle, multiplied by $D-d_0$ at slider 83, represents an altitude which the aircraft should be at upon reaching the outer marker. If the barometer which guides the pilot is accurate, its output, $h$, should have the same value. Since the barometer may not be accurate the quantity $h$ is indicated as different from $\alpha(D-d_0)$ in FIGURE 10. These quantities are subtracted in resistors 112 and 113.

The ILS beam angle, $\gamma$, is shown in FIGURE 10 and the ILS glide slope angular error signal, $e_G$, is also shown. This error signal is multiplied by $D-d_0$ in potentiometer 84 to form a quantity representing the altitude error of the aircraft relative to the ILS beam. This measured error signal is termed $Z_G$. It is subtracted from the output, Z, in resistors 118 and 119 to form a correction term $$\frac{1}{\tau}(Z-Z_G)$$

in which $$\frac{1}{\tau}$$

is a damping factor. To this term is added its own integral in integrator 121. This develops a combined correction term, $$\frac{1}{\tau}(Z-Z_G)+K\!\int (Z-Z_G)dt$$

which through loop action neutralizes any error which the barometer may have and also eliminates the error caused if the actual ILS glide slope angle differs from 2½°. This output is applied to the second integrator, 127, the output therefore being the integral of the above quantity applied to it.

The loop involving amplifiers 116, 122 and 128 is a negative feedback loop with two integrations and feedforward damping. It ultimately develops an output from amplifier 128 which causes Z to equal the average value of $Z_G$ by cancelling the errors in both $h$ and $d_0$ $(D-d_0)$. The error in $h$ is a fixed error and is cancelled by integrator 127. The $d_0(D-d_0)$ error decreases with time due to the diminution of D, and is neutralized at a slower rate by integrator 121. When cancellation is complete, Z equals the average value of $Z_G$ and the aircraft will be on the smoothed ILS glide path if the indication on the pilot indicator 7 produced by Z is held at zero.

The end of potentiometer 86 near its grounded terminal 152 is non-linearly tapered, while the remainder is linear. This produces an effect depicted in FIGURE 11 and results in aircraft glide flareout as it is about to touch down. In FIGURE 11 the ordinates represent position of the slider 83 on the potentiometer 86, being a function of the abscissa term $(D-d_0)$, the distance of the aircraft from the glide slope transmitter. The departure of the curve from linearity below point 153 represents the effect of the exponential potentiometer section. Thus as the aircraft approaches the runway, instead of flying into the ground at the glide slope transmiter location 90, the effect of this non-linear potentiometer is to give the aircraft some elevation $m$, FIG. 11, at that point, and the aircraft touches down at some point 154 beyond the transmitter 90, approaching touchdown with an appropriately decreased rate of descent.

The combination of the distant invention with a Doppler navigational system and a computer such as the TNC-50 provides the novel facility of effective missed-approach operation. The TNC-50 computer contains the "set" section, 22, FIG. 1, in addition to its normal "run" computing section, 21, by which the outer marker was approached. This "set" section can be set up in advance to compute and present any desired course beginning at any point. In setting this "set" section for a missed approach, a course is set in to begin at the far end of the runway, which is also the position of the localizer transmitter 72, FIG. 2. The course set in, beginning at that point, may be, for example, one which will cause the aircraft to come around to the outer marker for a second approach try. The "set" section of the computer is started running by the contacts 27, FIG. 1, and until these contacts close remains at the values set in.

In operation, let it be supposed that for some reason the aircraft makes an approach, using the instrument of this invention, but does not land. Over the field the pilot increases power and lifts his flaps. As the aircraft passes along but above the runway the distance D becomes less as indicated by the dial 23 until, at the localizer transmitter, this dial reading becomes zero. At this point the cam 26 closes its contacts 27. This starts the "set" part of the TNC-50 computer operating, providing pilot guidance for the first leg of the desired set-in missed-approach course.

The apparatus of the invention may be conveniently employed for approach and landing at airfield runways not provided with ILS facilities. The localizer and glide slope beams are absent and the outer marker beacon is absent. The switches 132 and 134, FIGS. 1 and 3, are set at "non-ILS" and "automatic." Assuming navigation toward the airfield with a computer such as the TNC-50, the final leg before the approach from some reasonably close fix point is terminated at a selected approach-start point in line with the runway center line and some five to seven miles from the runway threshold. An altitude has been computed and selected which, at this approach-start point, will start 2½° glide slope to touchdown. At this approach-start point the aircraft will be at the selected altitude, its track will point toward the threshold, the computer dial 20, "naut. miles to go," will have reached zero, and the computer will have closed its contacts 136, FIG. 1.

Closing of the contacts 136 operates the two clutches 52 and 79, causing them to engage, and places the four switches 67, 69, 131 and 126 in the positions opposite to those shown. The instrument approach and landing system immediately begins to operate as before described except that the feedback loops do not operate.

The operation of the system of this invention may be initiated manually, without use of the TNC-50 computer. In that case the switch 132 is set at ILS if the field is equipped with ILS, or at non-ILS if not. The switch 134 is set at "manual." The dial 23 is set at a distance $D_0$ to a selected fix point an appropriate distance from the threshold of the runway. This distance must be accurately known and the fix point must be readily recognizable by the pilot. When the aircraft reaches this point the pilot operates the manual switch 137 to "start." This energizes the clutches and, if ILS is used, the electromagnetic switches.

When the switch 132 is thrown to "non-ILS," at the start of the approach the clutches 52 and 79 are closed, but the electromagnetic switches 67, 69, 131 and 126 are not operated, so that these switches are at their positions opposite to those depicted in FIG. 1. This renders the two feedback paths containing these switches ineffective. The entire circuit is thereby rendered less accurate, for the described error-eliminating actions of these feedbacks are absent. Even with this limitation, however, the facilities provided constitute a considerable improvement over any other self-contained facilities now in existence for instrument approach or landing.

This invention may be employed to make a regulated change enroute from one flying level to another. To do this, dial 99 is set to the altitude, $h_r$, to which it is desired to ascend or descend. The switch 156 is set at $+\alpha_0$ if descent is required or at $-\alpha_0$ for ascent. The ILS switch 132 is set at "non-ILS," switch 134 at "manual" and switch 137 at reset. The dial D is now set to the value which centers the bail 13 on the pilot direction indicator 7. Switch 137 is now moved to "start," which causes the clutches 52 and 79 to clutch and the descent or ascent starts. The pilot now steers so as to keep bail 13 centered. If he does this, the aircraft will descend or ascend at 2½° and, with flareout, attains the desired level.

What is claimed is:

1. An aircraft instrument approach and landing system comprising, landing system means producing an output signal representing horizontal angular error of aircraft position as respects a landing runway, self-contained navigational means producing output signals representing aircraft ground track speed and flight direction, means having said aircraft flight direction signal applied thereto and producing therefrom a signal representing aircraft angular steering error, means having said angular steering-error signal and said ground-track speed signal impressed thereon and producing a first cross-track signal therefrom, means producing a second cross-track error signal from said horizontal angular error signal, means comparing said first and second cross-track error signals and producing a comparison error signal therefrom, and means for correcting said first cross-track error signal in accordance with the magnitude of said comparison error signal.

2. An aircraft instrument approach and landing system comprising, landing system means producing an output signal representing horizontal angular error of aircraft position as respects a landing runway, self-contained navigational means producing output signals representing aircraft ground track speed and flight direction, means for generating a signal representative of the magnetic bearing of said runway, means operated by said magnetic bearing signal and said flight direction signal for producing a signal representing aircraft angular steering error, means having said angular steering-error signal and said ground-track speed signal impressed thereon and producing a first cross-track error signal therefrom, means actuated by said ground-track speed signal and said steering-error signal for producing a signal representative of distance to go to a selected point on said landing runway, means operated by said distance-to-go signal and said horizontal angular error signal for producing a second cross-track error signal therefrom, means comparing said first and second cross-track error signals and producing a comparison error signal therefrom, and means for correcting said first cross-track error signal in accordance with the magnitude of said comparison error signal.

3. An aircraft instrument approach and landing system comprising, an instrument landing system producing an output signal representing horizontal angular error of aircraft position as respects a landing runway, a Doppler radar navigational system producing output signals representing aircraft ground track speed and flight direction, manual means for generating a signal representative of the magnetic bearing of said runway, means for subtracting said flight direction signal from said magnetic bearing signal and producing therefrom a difference signal representative of aircraft angular steering error, a resolver having its angular position determined by said angular steering-error signal and being energized by said ground track speed signal, a pair of output windings for said resolver disposed in quadrature space relationship whereby the signal magnitude on one of said windings is representative of the product of said ground-track speed signal and the sine of said steering-error signal, and the signal magnitude on the other of said windings is representative of the product of said ground-track speed signal and the cosine of said steering-error signal, means integrating said sine product signal for producing a first cross-track error signal, means for producing a signal representative of distance to go to a selected point on said landing runway from said cosine product signal, means operated by said distance-to-go signal and said horizontal error signal for producing a second cross-track error signal, means comparing said first and second cross-track error signals and producing a comparison error signal therefrom, and means correcting said first cross-track error signal in accordance with the magnitude of said comparison error signal.

4. An aircraft instrument approach and landing system comprising, an instrument landing system producing an output signal representing horizontal angular error of aircraft position as respects a landing runway, a Doppler radar navigational system producing output signals representing aircraft ground track speed and flight direction, manual means for generating a signal representative of the magnetic bearing of said runway, means for subtracting said flight direction signal from said magnetic bearing signal and producing therefrom a difference signal representative of aircraft angular steering error, a resolver having its angular position determined by said angular steering-error signal and being energized by said ground-track speed signal, a pair of output windings for said resolver disposed in quadrature space relationship whereby the signal magnitude on one of said windings is representative of the product of said ground-track speed signal and the sine of said steering-error signal, and the signal magnitude on the other of said windings is representative of the product of said ground-track speed signal and the cosine of said steering-error signal, means integrating said sine product signal for producing a first cross-track error signal, means for producing a signal representative of distance to go to a selected point on said landing runway from said cosine product signal, means operated by said distance-to-go signal and said horizontal error signal for producing a second cross-track error signal, means comparing said first and second cross-track error signals and producing a comparison error signal therefrom, means for integrating said comparison signal, and means for impressing a signal representative of said integrated comparison signal on said one output winding of said resolver in opposition to said sine product signal.

5. An aircraft instrument approach and landing system comprising, landing system means producing an output signal representing vertical angular error of aircraft position as respects a landing runway, self-contained navigational means producing output signals representing aircraft ground track speed and flight direction, means actuated by said ground track speed and flight direction signals for producing an output signal representative of distance to go to a selected point on said landing runway, means having said aircraft vertical angular error signal and said distance-to-go signal impressed thereon and producing therefrom a first altitude error signal, means for producing a signal representative of aircraft altitude with respect to said runway, means for producing a selected glide path angle signal, means having said aircraft altitude signal and said selected glide path angle signal impressed thereon and producing a second altitude error signal therefrom, means for comparing said first and second altitude error signals to produce a comparison altitude signal, and means for correcting said second altitude error signal in accordance with the magnitude of said comparison altitude signal.

6. An aircraft instrument approach and landing system comprising, landing system means producing an output signal representing vertical angular error of aircraft position as respects a landing runway, self-contained navigational means producing output signals representing aircraft ground track speed and flight direction, means actuated by said ground track speed and flight direction signals for producing an output signal representative of distance to go to a selected point on said landing runway, means having said aircraft vertical angular error signal and said distance-to-go signal impressed thereon and producing therefrom a first altitude error signal, a potentiometer having an initial linear portion and a terminal exponential portion, means energizing said potentiometer by a potential representative of a selected glide path angle, said potentiometer including a slider positioned in accordance with said distance-to-go signal, means for producing a signal representative of aircraft altitude with respect to said runway, means having said aircraft altitude signal and the potential developed at said potentiometer slider impressed thereon and producing a second altitude error signal therefrom, means for comparing said first and second altitude error signals to produce a comparison altitude signal, and means for correcting said second altitude error signal in accordance with the magnitude of said comparison altitude signal.

7. An aircraft instrument approach and landing system comprising, an instrument landing system producing an output signal representing vertical angular error of aircraft position as respects a landing runway, a Doppler radar navigational system producing output signals representing aircraft ground track speed and flight direction, manual means for generating a signal representative of the magnetic bearing of said runway, means for subtracting said flight direction signal from said magnetic bearing signal and producing therefrom a difference signal representative of aircraft angular steering error, a resolver having its angular position determined by said angular steering error signal and being energized by said ground-track speed signal, said resolver including at least one output winding generating a signal representative of the product of said ground-track speed signal and the cosine of said steering error signal, means for integrating said cosine product signal and for producing therefrom a signal representative of distance to go to a selected point on said landing runway, means having said aircraft vertical angular error signal and said distance-to-go signal impressed thereon and producing therefrom a first altitude error signal, means for producing a signal representative of aircraft altitude with respect to said runway, means for producing a selected glide path angle signal, means having said aircraft altitude signal and said selected glide-path-angle signal impressed thereon and producing a second altitude error signal therefrom, means for comparing said first and second altitude error signals to produce a comparison altitude signal, and means for correcting said second altitude error signal in accordance with the magnitude of said comparison altitude signal.

8. An aircraft instrument approach and landing system comprising, an instrument landing system producing an output signal representing vertical angular error of aircraft position as respects a landing runway, a Doppler radar navigational system producing output signals representing aircraft ground track speed and flight direction, manual means for generating a signal representative of the magnetic bearing of said runway, means for subtracting said flight direction signal from said magnetic bearing signal and producing therefrom a difference signal representative of aircraft angular steering error, a resolver having its angular position determined by said angular steering-error signal and being energized by said ground-track speed signal, said resolver including at least one output winding generating a signal representative of the product of said ground-track speed signal and the cosine and said steering-error signal, means for integrating said cosine product signal and for producing therefrom a signal representative of distance to go to a selected point on said landing runway, means having said aircraft vertical angular-error signal and said distance-to-go signal impressed thereon and producing therefrom a first altitude error signal, a potentiometer having an initial linear portion and a terminal exponential portion, means energizing said potentiometer by a potential representative of a selected glide-path angle, said potentiometer including a slider positioned in accordance with said distance-to-go signal, means for producing a signal representative of the aircraft altitude with respect to said runway, means having said altitude signal and the potential developed at said potentiometer slider impressed thereon and producing a second altitude error signal therefrom, means for comparing said first and second altitude error signals to produce a comparison altitude signal, and means for correcting said second altitude error signal in accordance with the magnitude of said comparison altitude signal.

9. An aircraft instrument approach and landing system comprising, landing system means producing output signals representing horizontal and vertical angular errors of aircraft position as respects a landing runway, self-contained navigational means producing output signals representing aircraft ground track speed and flight direction, means having said aircraft flight-direction signal applied thereto and producing therefrom a signal representing aircraft angular steering error, means having said angular steering-error signal and said ground-track speed signal impressed thereon and producing a first cross-track error signal therefrom, means producing a second cross-track error signal from said horizontal angular-error signal, means comparing said first and second cross-track error signals and producing a comparison error signal therefrom, means for correcting said first cross-track error signal in accordance with the magnitude of said comparison error signal, means actuated by said ground-track speed signal and said flight direction signal for producing an output signal representative of distance to go to a selected point on said landing runway, means having said aircraft vertical angular-error signal and said distance-to-go signal impressed thereon and producing therefrom a first altitude error signal, means for producing a signal representative of aircraft altitude with respect to said runway, means for producing a selected glide-path angle signal, means having said aircraft altitude signal and said selected glide-path angle signal impressed thereon and producing a second altitude-error signal therefrom, means for comparing said first and second altitude-error signals to produce a comparison altitude signal, and means for correcting said second altitude-error signal in accordance with the magnitude of said comparison altitude error signal.

10. An aircraft instrument approach and landing system comprising, an instrument landing system producing output signals representing horizontal and vertical angular error of aircraft position as respects a landing runway, a Doppler radar navigational system producing output signals representing aircraft ground track speed and flight direction, means having said aircraft flight-direction signal applied thereto and producing therefrom a signal representing aircraft angular steering error, means having said angular steering error signal and said ground-track speed signal impressed thereon and producing a first cross-track error signal therefrom, means producing a second cross-track error signal from said horizontal angular-error signal, means comparing said first and second cross-track error signals and producing a comparison error signal therefrom, means for correcting said first cross-track error signal in accordance with the magnitude of said comparison error signal, means actuated by said ground-track speed signal and said flight direction signal for producing an output signal representative of distance to go to a selected point on said landing runway, means having said aircraft vertical angular-error signal and said distance-to-go signal impressed thereon and producing therefrom a first altitude-error signal, a potentiometer having an initial linear portion and a terminal exponential portion, means energizing said potentiometer by a potential representative of a selected glide-path angle, said potentiometer including a slider positioned in accordance with said distance-to-go signal, means for producing a signal representative of aircraft altitude with respect to said runway, means having said aircraft altitude signal and the potential developed at said potential slider impressed thereon and producing a second altitude-error signal therefrom, means for comparing said first and second altitude-error signals to produce a comparison altitude signal, and means for correcting said second altitude-error signal in accordance with the magnitude of said comparison altitude signal.

11. An aircraft instrument approach and leading system comprising, an instrument landing system producing output signals representing horizontal and vertical angular error of aircraft position as respects a landing runway, a Doppler radar navigational system producing output signals representing aircraft ground track speed and flight direction, manual means for generating a signal representative of the magnetic bearing of said runway, means operated by said magnetic bearing signal and said flight-direction signal for producing a signal representing aircraft angular steering error, means having said angular steering-error signal and said ground-track speed signal impressed thereon and producing a first cross-track error signal therefrom, means actuated by said ground-track speed signal and said steering-error signal for producing a signal representative of distance to go to a selected point on said landing runway, means operated by said distance-to-go signal and said horizontal angular-error signal for producing a second cross-track error signal therefrom, means comparing said first and second cross-track error signals and producing a comparison error signal therefrom, means for correcting said first cross-track error signals in accordance with the magnitude of said comparison error signal, means having said aircraft vertical angular-error signal and said distance-to-go signal impressed thereon and producing therefrom a first altitude-error signal, means for producing a signal representative of aircraft altitude with respect to said runway, means for producing a selected glide-path angle signal, means having said aircraft altitude signal and said selected glide-path angle signal impressed thereon and producing a second altitude-error signal therefrom, means comparing said first and second altitude-error signals to produce a comparison altitude signal, and means for correcting said second altitude-error signal in accordance with the magnitude of said comparison altitude-error signal.

12. An aircraft instrument approach and landing system comprising, an instrument landing system producing output signals representing horizontal and vertical angular error of aircraft position as respects a landing runway, a Doppler radar navigational system producing output signals representing aircraft ground track speed and flight direction, manual means for generating a signal representative of the magnetic bearing of said runway, means operated by said magnetic bearing signal and said flight-direction signal for producing a signal representing aircraft angular steering error, means having said angular steering-error signal and said ground-track speed signal impressed thereon and producing a first cross-track error signal therefrom, means actuated by said ground-track speed signal and said steering-error signal for producing a signal representative of distance to go to a selected point on said landing runway, means operated by said distance-to-go signal and said horizontal angular error signal for producing a second cross-track error signal therefrom, means comparing said first and second cross-track error signals and producing a comparison error signal therefrom, means for correcting said first cross-track error signal in accordance with the magnitude of said comparison error signal, means having said aircraft vertical angular-error signal and said distance-to-go signal impressed thereon and producing therefrom a first altitude error signal, a potentiometer having an initial linear portion and a terminal exponential portion, means energizing said potentiometer by a potential representative of a selected glide-path angle, said potentiometer including a slider positioned in accordance with said distance-to-go signal, means for producing a signal representative of aircraft altitude with respect to said runway, means having said aircraft altitude signal and the potential developed at said potential slider impressed thereon and producing a second altitude-error signal therefrom, means for comparing said first and second altitude-error signals to produce a comparison altitude signal, and means for correcting said second altitude-error signal in accordance with the magnitude of said comparison altitude signal.

13. An aircraft instrument approach and landing system comprising, an instrument landing system producing output signals representing horizontal and vertical angular error of aircraft position as respects a landing runway, a Doppler radar navigational system producing output signals representing aircraft ground track speed and flight direction, manual means for generating a signal representative of the magnetic bearing of said runway, means for subtracting said flight-direction signal from said magnetic bearing signal and producing therefrom a difference signal representative of aircraft angular steering error, a resolver having its angular position determined by said angular steering-error signal and being energized by said ground-track speed signal, a pair of output windings for said resolver disposed in quadrature space relationship whereby the signal magnitude on one of said windings is representative of the product of said ground-track speed signal and the sine of said steering-error signal magnitude on the other of said windings is representative of the product of said ground-track speed signal and the cosine of said steering-error signal, means integrating said sine product signal for producing a first cross-track error signal, means for integrating said cosine product signal and for producing therefrom a signal representative of distance to go to a selected point on said landing runway, means operated by said distance-to-go signal and said horizontal error signal for producing a second cross-track error signal, means comparing said first and second cross-track error signals and producing a comparison error signal therefrom, means correcting said first cross-track error signal in accordance with the magnitude of said comparison error signal, means having said aircraft vertical angular-error signal and said distance-to-go signal impressed thereon and producing therefrom a first altitude error signal, means for producing a signal representative of aircraft altitude with respect to said runway, means for producing a selected glide-path angle signal, means having said aircraft altitude signal and said selected glide-path angle signal impressed thereon and producing a second altitude error signal therefrom, means for comparing said first and second altitude-error signals to produce a comparison altitude signal, and means for correcting said second altitude-error signal in accordance with the magnitude of said comparison altitude signal.

14. An aircraft instrument approach and landing system comprising, an instrument landing system producing output signals representing horizontal and vertical angular error of aircraft position as respects a landing runway, a Doppler radar navigational system producing output signals representing aircraft ground track speed and flight direction, manual means for generating a signal representative of the magnetic bearing of said runway, means for subtracting said flight direction signal from said magnetic bearing signal and producing therefrom a difference signal representative of aircraft angular steering error, a resolver having its angular position determined by said angular steering-error signal and being energized by said ground-track speed signal, a pair of output windings for said resolver disposed in quadrature space relationship whereby the signal magnitude of one of said windings is representative of the product of said ground-track speed signal and the sine of said steering error signal, and the signal magnitude on the other of said windings is representative of the product of said ground-track speed signal and the cosine of said steering-error signal, means integrating said sine-product signal for producing a first cross-track error signal, means for integrating said cosine-product signal and for producing therefrom a signal representative of distance to go to a selected point on said landing runway, means operated by said distance-to-go signal and said horizontal error signal for producing a second cross-track error signal, means comparing said first and second cross-track error signals and producing a comparison error signal therefrom, means for integrating said comparison signal, means for impressing a signal representative of said integrated comparison signal on said one output winding of said resolver in opposition to said sine-product signal, means having said aircraft vertical angular-error signal and said distance-to-go signal impressed thereon and producing therefrom a first altitude-error signal, means for producing a signal representative of aircraft altitude with respect to said runway, means for producing a selected glide-path angle signal, means having said aircraft altitude signal and said selected glide-path angle signal impressed thereon and producing a second altitude-error signal therefrom, means for comparing said first and second altitude-error signals to produce a comparison altitude signal, and means for correcting said second altitude-error signal in accordance with the magnitude of said comparison altitude signal.

15. An aircraft instrument approach and landing system comprising, an instrument landing system producing output signals representing horizontal and vertical angular error of aircraft position as respects a landing runway, a Doppler radar navigational system producing output signals representing aircraft ground track speed and flight direction, manual means for generating a signal representative of the magnetic bearing of said runway, means for subtracting said flight-direction signal from said magnetic bearing signal and producing therefrom a difference signal representative of aircraft angular steering error, a resolver having its angular position determined by said angular steering-error signal and being energized by said ground-track speed signal, a pair of output windings for said resolver disposed in quadrature space relationship whereby the signal magnitude on one of said windings is representative of the product of said ground-track speed signal and the sine of said steering-error signal, and the signal magnitude on the other of said windings is representative of the product of said ground-track speed signal and the cosine of said steering-error signal, means integrating said sine-product signal for producing a first cross-track error signal, means for integrating said cosine product signal and for producing therefrom a signal representative of distance to go to a selected point on said landing runway, means operated by said distance-to-go signal and said horizontal error signal for producing a second cross-track error signal, means comparing said first and second cross-track error signals and producing a comparison error signal therefrom, means correcting said first cross-track error signal in accordance with the magnitude of said comparison error signal, means having said aircraft vertical angular-error signal and said distance-to-go signal impressed thereon and producing therefrom a first altitude-error signal, a potentiometer having an initial linear portion and a terminal exponential portion, means energizing said potentiometer by a potential representative of a selected glide-path angle, said potentiometer including a slider positioned in accordance with said distance-to-go signal, means for producing a signal representative of the aircraft altitude with respect to said runway, means having said altitude signal and the potential developed at said potentiometer slider impressed thereon and producing a second altitude-error signal therefrom, means for comparing said first and second altitude-error signals to produce a comparison altitude signal, and means for correcting said second altitude-error signal in accordance with the magnitude of said comparison altitude signal.

16. An aircraft instrument approach and landing system comprising, an instrument landing system producing output signals representing horizontal and vertical angular error of aircraft position as respects a landing runway, a Doppler radar navigational system producing output signals representing aircraft ground track speed and flight direction, manual means for generating a signal representative of the magnetic bearing of said runway, means for subtracting said flight-direction signal from said magnetic bearing signal and producing therefrom a difference signal representative of aircraft angular steering error, a resolver having its angular position determined by said angular steering-error signal and being energized by said ground-track speed signal, a pair of output windings for said resolver disposed in quadrature space relationship whereby the signal magnitude of one of said windings is representative of the product of said ground-track speed signal and the sine of said steering-error signal, and the signal magnitude on the other of said windings is representative of the product of said ground-track speed signal and the cosine of said steering-error signal, means integrating said sine-product signal for producing a first cross-track error signal, means for integrating said cosine-product signal and for producing therefrom a signal representative of distance to go to a selected point on said landing runway, means operated by said distance-to-go signal and said horizontal error signal for producing a second cross-track error signal, means comparing said first and second cross-track error signals and producing a comparison error signal therefrom, means for integrating said comparison signal, means for impressing a signal representative of said integrated comparison signal on said one output winding of said resolver in opposition to said sine-product signal, means having said aircraft vertical angular-error signal and said distance-to-go signal impressed thereon and producing therefrom a first altitude-error signal, a potentiometer having an initial linear portion and a terminal exponential portion, means energizing said potentiometer by a potential representative of a selected glide-path angle, said potentiometer including a slider positioned in accordance with said distance-to-go signal, means for producing a signal representative of the aircraft altitude with respect to said runway, means having said altitude signal and the potential developed at said potentiometer slider impressed thereon and producing a second altitude-error signal therefrom, means for comparing said first and second altitude-error signals to produce a comparison altitude signal, and means for correcting said second altitude-error signal in accordance with the magnitude of said comparison altitude signal.

17. An aircraft instrument approach and landing system comprising, self-contained navigational means producing output signals representing aircraft ground track speed and flight direction, means having said aircraft flight direction signals applied thereto and producing therefrom signals representing aircraft angular steering error, means having said angular steering-error signals and said ground-track speed signals impressed thereon and producing a cross-track distance error signal and a distance-to-go signal, altimeter means emitting an altitude signal, glide-slope angle-determining means emitting an angle signal, and means having said altitude signal and said angle signal impressed thereon and producing therefrom an altitude error signal.

No references cited.